United States Patent
Burton et al.

(10) Patent No.: US 9,728,190 B2
(45) Date of Patent: Aug. 8, 2017

(54) SUMMARIZATION OF AUDIO DATA

(71) Applicant: International Business Machines Corporation, Armonk, NY (US)

(72) Inventors: Peter H. Burton, Vancouver (CA); Donna K. Byron, Petersham, MA (US); Manvendra Gupta, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/340,713

(22) Filed: Jul. 25, 2014

(65) Prior Publication Data
US 2016/0027442 A1 Jan. 28, 2016

(51) Int. Cl.
G10L 15/00 (2013.01)
G10L 15/26 (2006.01)
G10L 15/18 (2013.01)
G10L 17/00 (2013.01)

(52) U.S. Cl.
CPC .......... *G10L 15/26* (2013.01); *G10L 15/1822* (2013.01); *G10L 17/00* (2013.01)

(58) Field of Classification Search
None
See application file for complete search history.

(56) References Cited

U.S. PATENT DOCUMENTS

| | | |
|---|---|---|
| 6,345,252 B1 | 2/2002 | Beigi et al. |
| 6,754,631 B1 | 6/2004 | Din |
| 7,236,580 B1 | 6/2007 | Sarkar et al. |
| 7,260,771 B2 | 8/2007 | Chiu et al. |

(Continued)

FOREIGN PATENT DOCUMENTS

CN 102572372 A 7/2012

OTHER PUBLICATIONS

Bessho, et al., "Topic Structure Extraction for Meeting Indexing", NTT Cyber Solutions Laboratories, NTT Corporation, <https://www.google.co.in/url?sa=t&rct=j&q=&esrc=s&source=web&cd=7&cad=rja&ved=0CFsQFjAG&url=http%3A%2F%2Fwww.researchgate.net%2Fpublication%2F221488667_Topic_structure_extraction_for_meeting_indexing%2Ffile%2Fd912f50a75388af4ff.pdf&ei=kL7cUtPRKIX8rAf6zICABg&usg=AFQjCNGRI11ATbkxO47o0_jP19-OE3YzOw&sig2.

(Continued)

*Primary Examiner* — Marcus T Riley
(74) *Attorney, Agent, or Firm* — Christopher McLane; Daniel R. Simek

(57) ABSTRACT

Aspects of the present invention disclose a method, computer program product, a service, and a system for generating a summary of audio on one or more computing devices. The method includes one or more processors retrieving an audio recording. The method further includes one or more processors identifying supplemental information associated with the audio recording, wherein the supplemental information includes information associated with content in the audio recording and information associated with one or more speakers of the audio recording. The method further includes one or more processors converting the audio recording to a transcript of the audio recording. The method further includes one or more processors generating a summary of the transcript of the audio recording based at least in part on the identified supplemental information.

20 Claims, 3 Drawing Sheets

(56) References Cited

U.S. PATENT DOCUMENTS

| | | | |
|---|---|---|---|
| 7,292,977 B2* | 11/2007 | Liu | G10L 15/28 704/236 |
| 7,496,510 B2 | 2/2009 | Frank et al. | |
| 7,660,715 B1* | 2/2010 | Thambiratnam | G10L 15/065 704/244 |
| 7,739,114 B1 | 6/2010 | Chen et al. | |
| 8,055,503 B2 | 11/2011 | Scarano et al. | |
| 2004/0064322 A1 | 4/2004 | Georgiopoulos et al. | |
| 2006/0047816 A1 | 3/2006 | Lawton et al. | |
| 2009/0276215 A1* | 11/2009 | Hager | G06F 17/273 704/235 |
| 2011/0099006 A1 | 4/2011 | Sundararaman et al. | |
| 2011/0161085 A1 | 6/2011 | Boda et al. | |
| 2011/0270609 A1 | 11/2011 | Jones et al. | |
| 2014/0039888 A1* | 2/2014 | Taubman | H04M 1/72572 704/235 |
| 2014/0163981 A1* | 6/2014 | Cook | G10L 15/26 704/235 |
| 2015/0058005 A1* | 2/2015 | Khare | G10L 15/063 704/235 |

OTHER PUBLICATIONS

Purver, et al., "Detecting Action Items in Multi-party Meetings: Annotation and Initial Experiments", Center for the Study of Language and Information, Stanford University, MLMI 2006, LNCS 4299, p. 200-211, 2006, © Springer-Verlag Berlin Heidelberg 2006, <http://rd.springer.com/chapter/10.1007/11965152_18>.

Renals, Steve, "Automatic analysis of multiparty meetings", The Centre for Speech Technology Research, University of Edinburgh, Sadhana, vol. 36, Part 5, Oct. 2011, p. 917-932, © Indian Academy of Sciences, <http://www.ias.ac.in/sadhana/Pdf2011Oct/917.pdf>.

Sire, et al., "Smart Meeting Minutes Application Specifications", Version 2.4, Aug. 2002, <http://diuf.unifr.ch/people/lalanned/Articles/specsSMM_2r4.pdf>.

Tur, et al., "The CALO Meeting Assistant System", IEEE Transactions on Audio, Speech, and Language Processing, © 2010 IEEE, <http://www.eecs.qmul.ac.ukt/~mpurver/papers/tur-et-al10ieee.pdf>.

"Cogi Recorder: Turn your iPhone® into a digital voice recorder", © 2014 Cogi, Inc., Apr. 10, 2014, <www.cogi.com/cogi-recorder-iphone.

"SoniClear Digital Recording", © SoniClear 2014, <http://www.soniclear.com/home.html>.

* cited by examiner

SUMMARIZATION OF AUDIO DATA

BACKGROUND OF THE INVENTION

The present invention relates generally to speech to text conversion, and more particularly to customized summarization of audio data.

Currently, programs exist that convert speech to text, include minutes from a meeting, and identify a speaker. Speech recognition is the translation of spoken words into text. Speech recognition is referred to as automatic speech recognition, computer speech recognition, or "speech to text". Some speech recognition systems use "speaker-independent speech recognition" while others use "training" wherein an individual speaker reads sections of text into the speech recognition system. These systems analyze the person's specific voice and use it to fine tune the recognition of that person's speech, resulting in more accurate transcription. Systems that do not use training are called "speaker-independent" systems, whereas, systems that use training are called "speaker-dependent" systems. Speech recognition applications can include voice user interfaces such as voice dialing, call routing, simple data entry, preparation of structured documents, speech-to-text processing, and direct voice input. Voice recognition, or speaker identification, refers to finding the identity of the speaker rather than what is being said. In some instances, speech recognition is used in teleconferences, web conferences, presentations, etc. to give accurate meeting minutes or transcripts of the event.

SUMMARY

Aspects of the present invention disclose a method, a computer program product, a service, and a system for generating a summary of audio on one or more computing devices. The method includes one or more processors retrieving an audio recording. The method further includes one or more processors identifying supplemental information associated with the audio recording, wherein the supplemental information includes information associated with content in the audio recording and information associated with one or more speakers of the audio recording. The method further includes one or more processors converting the audio recording to a transcript of the audio recording. The method further includes one or more processors generating a summary of the transcript of the audio recording based at least in part on the identified supplemental information. In another aspect of the present invention, the method further includes one or more processors sending the generated summary of the transcript of the audio recording to one or more participants of the audio recording.

DETAILED DESCRIPTION

Embodiments of the present invention convert audio data into user-friendly summaries that can contain supplemental information and perform tasks such as schedule future events that were discussed in an audio recording. Embodiments of the present invention allow for the creation of summaries of audio recordings. Embodiments of the present invention also supplement audio recordings with additional information related to the audio recording, add additional background information about a speaker, send emails about future meetings or duties discussed, and post activities to calendars.

Some embodiments of the present invention recognize that audio data conversion programs translate the data verbatim. Additionally, the audio data conversion programs do not set future appointments based on information discussed in the audio data or send emails regarding tasks that were discussed in the audio data.

Implementation of embodiments of the invention may take a variety of forms, and exemplary implementation details are discussed subsequently with reference to the Figures.

Figure 1:
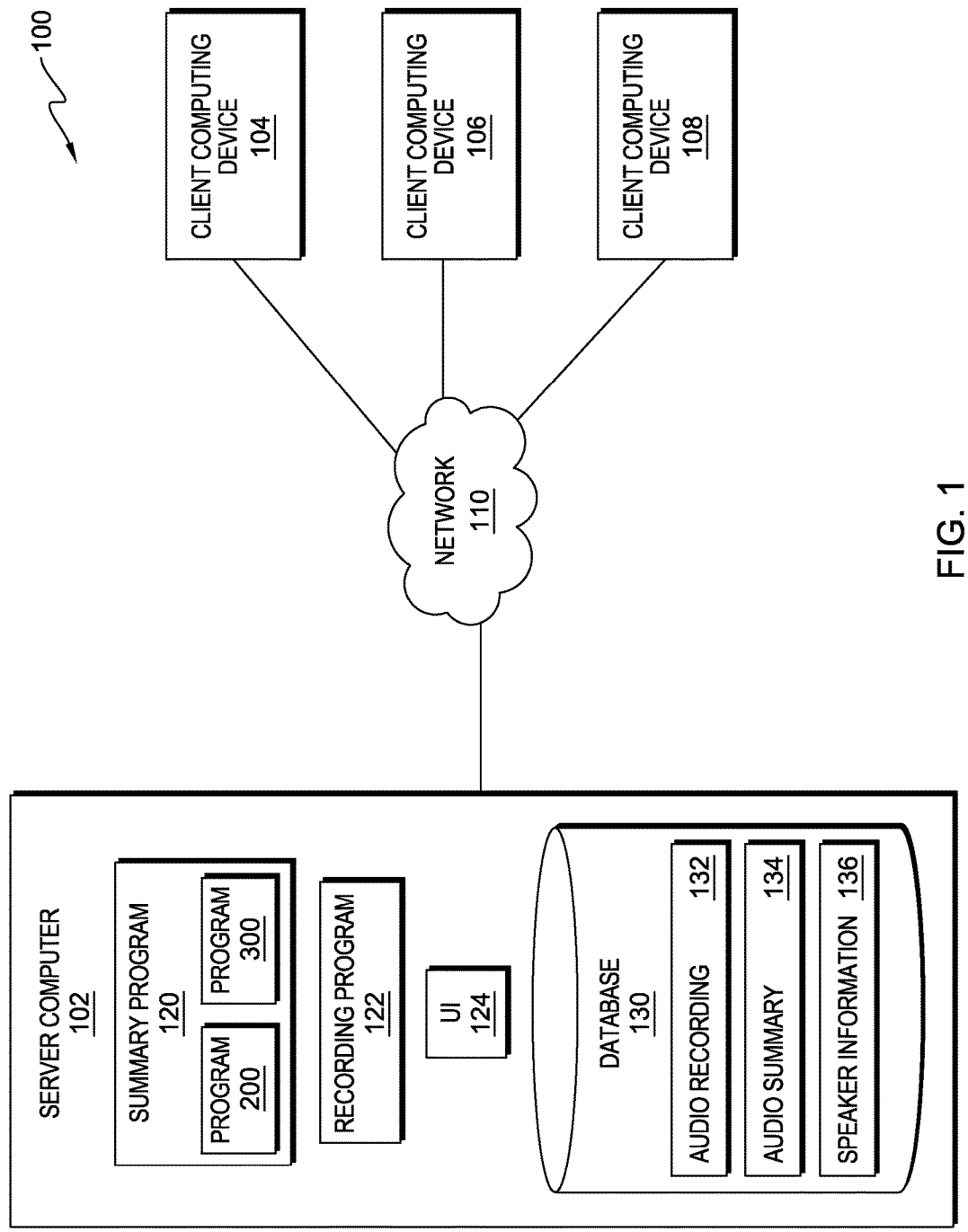
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 102 and client computing devices 104, 106, and 108, all interconnected over network 110. Network 110 can be, for example, a telecommunications network, a local area network (LAN), a wide area network (WAN), such as the Internet, or a combination of the three, and can include wired, wireless, or fiber optic connections. Network 110 may include one or more wired and/or wireless networks that are capable of receiving and transmitting data, voice, and/or video signals, including multimedia signals that include voice, data, and video information.

Server computer 102 may be a management server, a web server, or any other electronic device or computing system capable of receiving and sending data. In other embodiments, server computer 102 may represent a server computing system utilizing multiple computers as a server system, such as in a cloud computing environment. In another embodiment, server computer 102 may be a laptop computer, a tablet computer, a netbook computer, a personal computer (PC), a desktop computer, a personal digital assistant (PDA), a smart phone, or any programmable electronic device capable of communicating with client computing device 104, 106, and 108 via network 110. In another embodiment, server computer 102 represents a computing system utilizing clustered computers and components to act as a single pool of seamless resources. Server computer 102 includes database 130, user interface (UI) 124, summary program 120, and recording program 122.

In the depicted embodiment, database 130 resides on server computer 102 and contains audio recording 132, audio summary 134, and speaker information 136. In another embodiment, database 130 may reside elsewhere in the distributed data processing environment 100. A database is an organized collection of data. Database 130 can be implemented with any type of storage device capable of storing data that may be accessed and utilized by server computer 102 and client computing devices 104, 106, and 108, such as a database server, a hard disk drive, or a flash memory. In other embodiments, database 130 can represent multiple storage devices within server computer 102.

Database 130 stores audio data and related content (e.g., visual diagrams), which includes audio recording 132, audio summary 134, and speaker information 136. In one example, audio recording 132 may be a recording of a conference call or meeting. Another example of audio recording 132 may be a dictation by a doctor. In yet another example, audio recording 132 may be a sports broadcast. Database 130 also stores information pertaining to speakers of audio recording 132 in speaker information 136. In an example, speaker information 136 contains information pertaining to a speaker, including the name, job title, roles in an organization, and technical background corresponding to the speaker. Speaker information 136 could be gathered by a speaker recognition program, by speakers stating names, by speakers being associated with a specific device, or by any other method currently known in the art. Speaker information 136 may also contain information from a corporate directory or calendar information. In an example, a corporate directory may store a person's job role, function, hierarchy, current and future projects, and contact information. The calendar information may contain project dates, meeting dates, deadlines, or vacation times. Further, database 130 contains summary information (e.g., audio summary 134) generated by summary program 120 pertaining to audio recording 132 and associated information. In the depicted environment, audio summary 134 was generated by summary program 120 and stored in database 130.

User interface 124 is a program that provides an interface between a user of server computer 102 and a plurality of applications that reside on server computer 102. A user interface, such as user interface 124, refers to the information (such as graphic, text, and sound) that a program presents to a user and the control sequences the user employs to control the program. There are many known types of user interfaces. In one embodiment, user interface 124 is a graphical user interface. A graphical user interface (GUI) is a type of user interface that allows users to interact with electronic devices, such as a computer keyboard and mouse, through graphical icons and visual indicators, such as secondary notation, other types of user interfaces that can be used are text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements.

In depicted distributed data processing environment 100, summary program 120 resides on server computer 102 and sends and receives information with client computing devices 104, 106, and 108. In one embodiment, summary program 120 processes an audio recording stored in database 130 and stores the processed audio information as audio summary 134. In another embodiment, summary program 120 may also process an audio recording received from client computing devices 104, 106, and 108. In this embodiment, summary program 120 determines how to summarize the audio into pertinent text, sends emails to participants, and adds information to calendars of participants. Summary program 120 is depicted and described in further detail with respect to FIG. 2 and FIG. 3.

In depicted distributed data processing environment 100, recording program 122 is located on server computer 102. Recording program 122 records audio information and stores the audio information in database 130. In the depicted embodiment, recording program 122 stores audio recording 132 in database 130. In an embodiment, recording program 122 may be a subprogram of summary program 120. In another embodiment, recording program 122 may be located on a client computing device that is connected to server computer 102 via network 110 (e.g., client computing devices 104, 106, and 108). In some embodiments, recording program 122 may store speaker information and other digital materials along with audio recording 132 in database 130. Database 130 is depicted and described in further detail with respect to FIG. 4.

Client computing devices 104, 106, and 108 may each be a desktop computer, a laptop computer, a tablet computer, a specialized computer server, a smart phone, or any programmable electronic device capable of communicating with server computer 102 via network 110 and with various components and devices within distributed data processing environment 100. In general, client computing devices 104, 106, and 108 represent any programmable electronic device or combination of programmable electronic devices capable of executing machine readable program instructions and communicating with other computing devices via a network, such as network 110.

Figure 2:
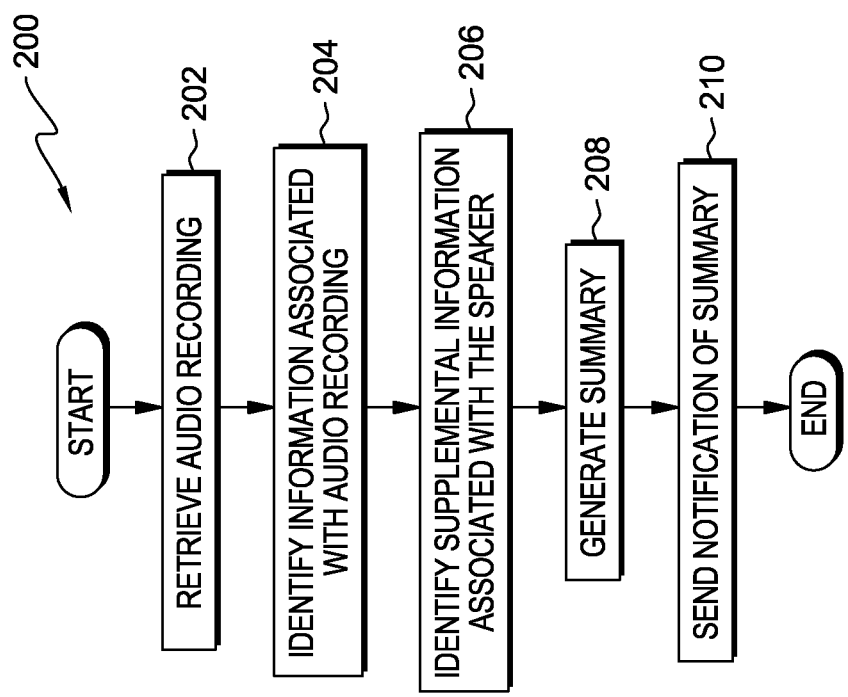
FIG. 2 is a flowchart depicting operational steps of a program for summarizing and supplementing audio data on a server computer within the distributed data processing environment of FIG. 1, in accordance with an embodiment of the present invention.

FIG. 2 is a flowchart depicting operational steps of program 200, one function of summary program 120, in accordance with an embodiment of the present invention. Program 200 operates on server computer 102 to summarize audio recordings and associated materials. In one embodiment, program 200 initiates upon completion of an audio recording by recording program 122. In another embodiment, program 200 initiates as soon as recording program 122 begins an audio recording. In yet another embodiment, program 200 begins upon the request of a user to summarize an audio recording stored in database 130. Program 200 is capable of summarizing and supplementing audio as soon as a recording begins, or at any later time. In an embodiment with a live audio feed, program 200 may supplement participants or listeners with additional information or notes pertaining to the audio feed.

Program 200 retrieves an audio recording (step 202). In one embodiment, program 200 retrieves audio recording 132, which is stored in database 130. In another embodiment, program 200 will receive a live audio feed directly (e.g., from recording program 122). In an embodiment, program 200 receives a completed audio recording from a client device (e.g., client computing device 104) via network 110. In yet another embodiment, program 200 accesses a live audio stream in recording program 122. In an example, audio recording 132, a conference call recording, has been stored in database 130, and program 200 retrieves the audio recording in response to a summary request from a user of client computing device 104.

Program 200 identifies information associated with the audio recording (step 204). In an embodiment, program 200 identifies files associated with audio recording 132. In an example, program 200 identifies presentation slides that correspond to a speech. In another example, program 200 identifies video that is associated with an audio recording, such as the video of a sporting event. Yet another example may comprise a court reporter's notes associated with an audio recording of a deposition or a courtroom proceeding. In one embodiment, program 200 determines one or more speakers from the audio recording. In another embodiment, the one or more speakers in the audio recording are already determined. For example, when a participant joins a conference call, each phone has an identification that corresponds to each participant. Program 200 can utilize metadata associated with the audio recording to identify each speaker. In another example, recording program 122 has a voice recognition program that determines each speaker by the distinct sound of the speaker's voice. In an embodiment, program 200 identifies the date, time, and context of the audio record. For example, the speech may be part of a program at a conference, and the conference proceedings would be utilized for semantic analysis. In another example, a business team may have documents associated with a project identified by program 200.

Program 200 identifies supplemental information associated with speakers in the audio recording (step 206). A speaker can be a person that is involved with an audio recording. In one embodiment, program 200 accesses a corporate directory to identify information about a speaker such as title, education, years at a position, professional accomplishments, areas of expertise, etc. In another embodiment, program 200 may search Internet sites for additional information on a speaker. Examples of Internet sites may include social media, news organizations sites, university sites, government sites, etc. In an embodiment, program 200 may also search a calendar of a speaker to locate future meetings, speeches, or open dates. Program 200 may access a corporate calendar or personal calendar if granted access. In one embodiment, the identified information is stored in database 130, as speaker information 136. In another embodiment, the information may be stored as metadata that is associated with the corresponding audio recording (e.g., audio recording 132).

Program 200 generates a summary of the audio recording (step 208). In one embodiment, program 200 generates audio summary 134 of audio recording 132. In another embodiment, program 200 may create multiple summaries of an audio recording. In an example, two companies may attend one meeting, and program 200 generates a specialized summary for each company. A specialized summary may comprise private corporate information or customized summary settings. In a deposition example, a summary for one party may be supplemented with privileged information, while another party may be given a more generic version or just a verbatim translation from audio to text. In an embodiment, in response to an audio recording starting, program 200 begins summarizing the audio recording which enables the summary to be completed as soon as the recording terminates. In another embodiment, words or phrases from the audio recording may prompt summary program 120 to draft emails of discussed tasks or determine if summary program 120 may add future discussed meetings to a calendar. In one embodiment, program 200 may search for definitions or pictures of matters discussed in the audio to supplement the textual summary. Step 208 is discussed in further detail in FIG. 3.

Program 200 sends a notification of the summary (step 210). In one embodiment, program 200 sends an email to all participants of an audio event, such as a presentation, to notify the participants that a summary of the audio recording is available. In another embodiment, program 200 automatically sends a summary to all participants. In an embodiment, program 200 sends a summary to all speakers so that the speakers can proof the summary before forwarding the summary to other participants. In another embodiment, program 200 may send emails, text messages, etc. to speakers with follow-up questions or schedule events on a calendar. For example, if two speakers discuss an issue and a task is assigned to one speaker, program 200 may send an email to the two speakers with a reminder to complete the assigned task along with pertinent information from the meeting and supplemental information provided by program 200.

Figure 3:
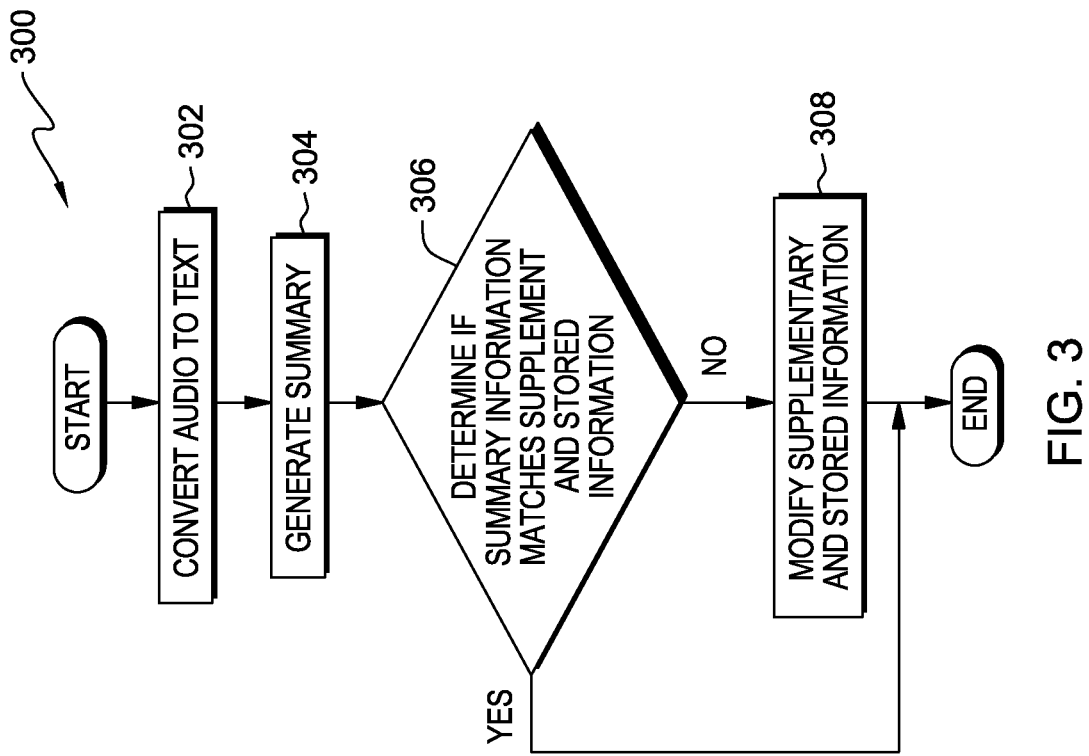
FIG. 3 is a flowchart depicting operational steps of a program for generating a summary of the audio recording on a server computer within the distributed data processing environment of FIG. 1, in accordance with an embodiment of the present invention.

FIG. 3 is a flowchart depicting operational steps of program 300, one embodiment of step 208 of program 200, in accordance with an embodiment of the present invention. Program 300 operates on server computer 102 and summarizes audio recordings and associated materials. In one embodiment, program 300 initiates in response to program 200 gathering information from database 130 associated with audio recording 132. In another embodiment, program 300 initiates as soon as recording program 122 begins a recording. In yet another embodiment, program 300 initiates in response to the request of a user to summarize audio recording 132. Program 300 can begin summarizing and supplementing audio data as soon as an audio recording begins or at any later time. In an embodiment with a live feed of a presentation, program 300 may supplement participants or listeners with additional information or notes pertaining to the audio recording during the presentation.

Program 300 converts the audio recording into text (step 302). In one embodiment, program 300 accesses audio recording 132 in database 130 and converts the audio recording into a verbatim text transcript of the audio recording. Program 300 may convert an audio recording to text using probabilistic models, hidden Markov models, or other methods known in the art. In an embodiment, program 300 adjusts contextual probabilities used in both speaker recognition and in converting the audio recording to text. For example, the role of a speaker, the expertise of the speaker, and calendar information are each an additional information source for contextualizing probabilities. To further the example, a speaker who is a project manager is more likely to talk about deadlines, milestones, actions, etc., and the aforementioned information will contribute additional data if incorporated into the probabilistic models. In an embodiment, program 300 converts a live audio feed into text in real time.

Program 300 generates a summary (step 304). In one embodiment, program 300 summarizes the text generated in step 302 by using deep natural language processing. In an embodiment, deep natural language processing coupled with semantic analysis allows program 300 to break sentences into different sections. In one example, program 300 has the text of a conversation between speaker one and speaker two regarding items that they need at a grocery store. Program 300 may then extract information stating that speaker two should go to the grocery store and create a shopping list. Program 300 determines the action of going to the grocery store and that the list of items being discussed are to be purchased at the grocery store by speaker two. In another example, program 300 may go further and check for directions to the nearest grocery store, determine if the items on the list are in stock, or create an online order for approval by speaker two. To further the example, program 300 may even add nutritional facts and pictures to the items on the list.

In one embodiment, by using semantic analysis, program 300 can identify items by breaking a textual sentence into different portions to determine nouns, verbs, adjectives, subject matters, actions, etc. In an embodiment, program 300 looks for keywords that trigger certain actions or are used in certain ways. In an example, program 300 searches for names and recognizes the names as nouns or subjects of a sentence. In another example, program 300 searches for action items such as "write and email". In this example, program 300 may generate an email for the person that the text indicates is to write the email, and the subject matter of the email contains the discussed material. In an embodiment, program 300 uses corpus linguistics to summarize the audio data. In an example of corpus linguistics, program 300 may utilize structural markup, speech tagging, parsing, statistical evaluations, optimization of rule bases, knowledge discovery methods, etc. to generate a summary.

In another example, program 300 determines action items by looking for keywords in the text transcript of the audio recording. Examples of keywords that program 300 can determine using semantic rules for a task or assignment may comprise: "can you do", "are you able to", "next steps", "when do we meet next", "what's next", "who do we need on the next call", etc. In one example, program 300 is utilized for a voice dictation system. In the previous example, program 300 applies metadata rules to digitized meeting text to determine nouns, verbs, and adjectives in order to process the text and determine the underlying semantics of events, topics, meetings, etc. To further the example, the metadata rules define the structure of an event such as, introduction, summary, example, case study, technical content, sales content, reference materials, links, etc. In an embodiment, program 300 utilizes metadata rules to process the raw text to discern and define the structure of the event.

In one embodiment, program 300 generates metadata corresponding to a presentation delivered by one or more speakers including items such as topics covered, summary of ideas for each topic, products discussed, next steps identified, the questions asked and indexed by participants, and the answers provided. In another embodiment, program 300 can generate rich textual documents with content enrichment for a specific topic. For example, a dictation of a doctor could be enriched with images and reference information about the subject being dictated.

In another embodiment regarding a dictation of a doctor, program 300 leverages semantic rules to identify medical terminology including anatomy, conditions, symptoms, procedures, treatments, etc. In an example, program 300 may process the audio data of a heart bypass. Program 300 may detect terms such as heart, coronary, arteriosclerosis, cholesterol, etc. and conduct research into the terminology to enrich the audio recording with the results of the research.

Program 300 determines if the summary information matches supplemental and stored information (decision 306). In one embodiment, program 300 compares information from the identified information associated with the audio recording from step 204 and the identified supplemental information associated with the speaker step 206 to determine if the information stated by the one or more speakers matches the identified information. Examples of matching information may include a job title of the speaker, the role of the speaker in a department, etc. In an embodiment, program 300 determines is the summary information substantially matches the transcript. In an example, program 300 may make a determination that the job title of secretary is substantially similar to administrative assistant. If program 300 determines that there is a match between the audio converted text and the supplementary information, then program 300 goes to end (yes branch, decision 306). In an example of a match, the profile information (e.g., research area) for a speaker matches the information the speaker stated regarding the speakers profile information.

Program 300 modifies the supplementary and stored information (step 308). In response to determining that the summary information does not match the supplemental and stored information (no branch, decision 306), program 300 revises the supplementary information to reflect the new information (step 308). In an example, program 300 may send a prompt (e.g., email) to a speaker associated with the information that does not match to determine which information should be included in the summary or adjusted on a corporate website (e.g., a job title). In another embodiment, program 300 includes the information that does not match but flags or draws attention in some way to notify a reader that the information does not match. For example, bolding or changing the color of the text.

In another embodiment, the invention provides a business method that performs the process steps of the invention on a subscription, advertising, and/or fee basis. That is, a service provider, such as a Solution Integrator, could offer to software management. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Figure 4:
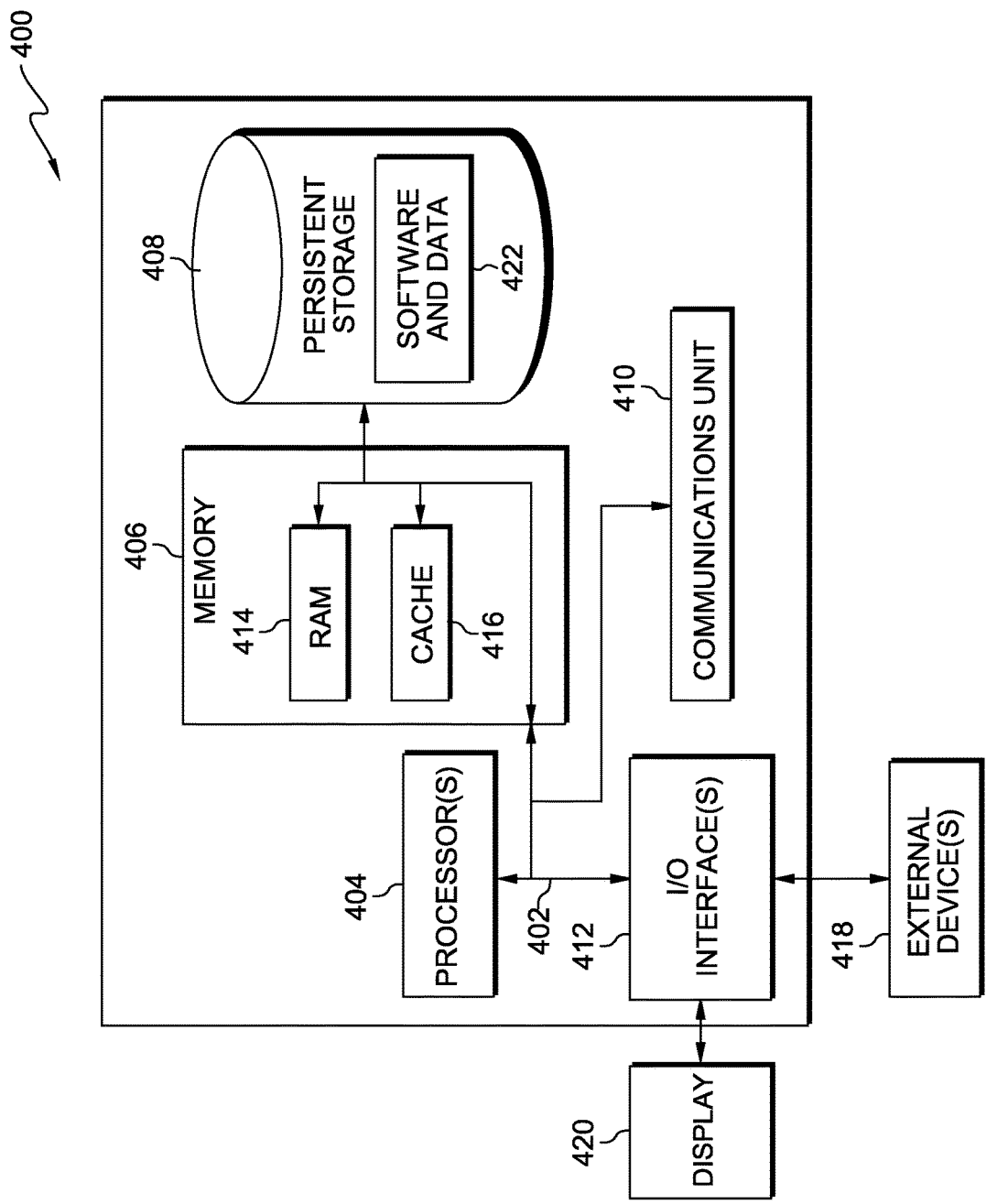
FIG. 4 depicts a block diagram of components of the computing system of FIG. 1, in accordance with an embodiment of the present invention.

FIG. 4 depicts a block diagram of components of computer 400, which is representative of server computer 102 and client computers 104, 106, and 108, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processor(s) 404 via one or more memories of memory 406. With respect to server computer 102, software and data 422 represents summary program 120, recording program 122, program 200, program 300, database 130, and UI 124.

In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data 422 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, a service and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for summarizing audio, the method comprising:
   retrieving, by one or more computer processors, an audio recording;
   identifying, by one or more computer processors, supplemental information associated with the audio recording, wherein the supplemental information includes additional information beyond information in a transcript based at least in part on one or more words in the audio recording and information associated with one or more speakers of the audio recording, wherein identifying supplemental information included at least in part identifying supplemental information on Internet related to topics in the transcript;
   converting, by one or more computer processors, the audio recording to a transcript of the audio recording; and
   generating, by one or more computer processors, a summary of the transcript of the audio recording including at least in part the identified supplemental information.

2. The method of claim 1, further comprising:
   sending, by one or more computer processors, the generated summary of the transcript of the audio recording to one or more participants of the audio recording, wherein the generated summary of the transcript comprises at least in part supplemental information.

3. The method of claim 1, further comprising:
   determining, by one or more computer processors, if the supplemental information associated with the audio recording substantially matches the transcript of the audio recording, wherein supplemental information includes information identified based on content in the audio recording but not contained within the audio recording; and
   in response to determining that the supplemental information associated with the audio recording does not substantially match the transcript of the audio recording, modifying, by one or more computer processors, the supplemental information associated with the audio recording to match the information in the transcript.

4. The method of claim 1, wherein the audio recording is a live audio feed.

5. The method of claim 1, wherein generating a summary of the transcript of the audio recording comprises:
   generating, by one or more computer processors, a notification for at least one of one or more participants of the audio recording based, at least in part, upon the summary of the transcript of the audio recording, wherein a notification includes one or more of: directions for a task for one or more of the participants of the audio recording stated in the audio recording, a question posed in the audio recording to the one or more participants of the audio recording, an action to be taken by at least one of the one or more participants of the audio recording that was stated in the audio recording; and
   sending, by one or more computer processors, the generated notification to the one or more participants of the audio recording.

6. The method of claim 1, wherein supplemental information associated with the audio recording includes one or more of: visual and textual information used during the audio recording, supplemental research on one or more topics discussed in the audio recording, and definitions of terms in the audio recording.

7. The method of claim 1, wherein the information associated with one or more speakers of the audio recording includes one or more of: corporate directories, person and corporate calendars, contact information, and social media information.

8. A computer program product for summarizing audio, the computer program product comprising:
   one or more computer readable storage media and program instructions stored on the one or more computer readable storage media, the program instructions comprising:
   program instructions to retrieve an audio recording;
   program instructions to identify supplemental information associated with the audio recording, wherein the supplemental information includes additional information beyond information in a transcript based at least in part on one or more words in the audio recording and information associated with one or more speakers of the audio recording, wherein identifying supplemental information included at least in part identifying supplemental information on Internet related to topics in the transcript;

program instructions to convert the audio recording to a transcript of the audio recording; and program instructions to generate a summary of the transcript of the audio recording including at least in part the identified supplemental information.

9. The computer program product of claim 8, further comprising instructions, stored on the one or more computer readable storage media, to:

send the generated summary of the transcript of the audio recording to one or more participants of the audio recording, wherein the generated summary comprises at least in part supplemental information.

10. The computer program product of claim 8, further comprising instructions, stored on the one or more computer readable storage media, to:

determine if the supplemental information associated with the audio recording substantially matches the transcript of the audio recording, wherein the supplemental information includes information identified based on content in the audio recording but not contained within the audio recording; and in response to determining that the supplemental information associated with the audio recording does not substantially match the transcript of the audio recording, modify the supplemental information associated with the audio recording to match the information in the transcript.

11. The computer program product of claim 8, wherein the program instructions to generate a summary of the transcript of the audio recording comprises program instructions to:

generate a notification for at least one of one or more participants of the audio recording based, at least in part, upon the summary of the transcript of the audio recording, wherein a notification includes one or more of: directions for a task for one or more of the one or more participants of the audio recording stated in the audio recording, a question posed in the audio recording to the one or more participants of the audio recording, an action to be taken by at least one of the one or more participants of the audio recording that was stated in the audio recording; and send the generated notification to the one or more participants of the audio recording.

12. The computer program product of claim 8, wherein supplemental information associated with the audio recording includes one or more of: visual and textual information used during the audio recording, supplemental research on one or more topics discussed in the audio recording, and definitions of terms in the audio recording.

13. The computer program product of claim 8, wherein the information associated with one or more speakers of the audio recording includes one or more of: corporate directories, person and corporate calendars, contact information, and social media information.

14. A computer system for summarizing audio, the computer system comprising:

one or more computer processors;
one or more computer readable storage media;
program instructions stored on the computer readable storage media for execution by at least one of the one or more computer processors, the program instructions comprising:
program instructions to retrieve an audio recording;
program instructions to identify supplemental information associated with the audio recording, wherein the supplemental information includes additional information beyond information in a transcript based at least in part on one or more words in the audio recording and information associated with one or more speakers of the audio recording, wherein identifying supplemental information included at least in part identifying supplemental information on Internet related to topics in the transcript;

program instructions to convert the audio recording to a transcript of the audio recording; and program instructions to generate a summary of the transcript of the audio recording including at least in part the identified supplemental information.

15. The computer system of claim 14, further comprising program instructions, stored on the computer readable storage media for execution by at least one of the one or more computer processors, to:

send the generated summary of the transcript of the audio recording to one or more participants of the audio recording, wherein the generated summary comprises at least in part supplemental information.

16. The computer system of claim 14, further comprising program instructions, stored on the computer readable storage media for execution by at least one of the one or more computer processors, to:

determine if the supplemental information associated with the audio recording substantially matches the transcript of the audio recording, wherein supplemental information includes information identified based on content in the audio recording but not contained within the audio recording; and in response to determining that the supplemental information associated with the audio recording does not substantially match the transcript of the audio recording, modify the supplemental information associated with the audio recording to match the information in the transcript.

17. The computer system of claim 14, wherein generating a summary of the transcript of the audio recording comprises program instructions to:

generate a notification for at least one of one or more participants of the audio recording based, at least in part, upon the summary of the transcript of the audio recording, wherein a notification includes one or more of: directions for a task for one or more of the participants of the audio recording stated in the audio recording, a question posed in the audio recording to the one or more participants of the audio recording, an action to be taken by at least one of the one or more participants of the audio recording that was stated in the audio recording; and send the generated notification to the one or more participants of the audio recording.

18. The computer system of claim 14, wherein supplemental information associated with the audio recording includes one or more of: visual and textual information used during the audio recording, supplemental research on one or more topics discussed in the audio recording, and definitions of terms in the audio recording.

19. The computer system of claim 14, wherein the information associated with one or more speakers of the audio recording includes one or more of: corporate directories, person and corporate calendars, contact information, and social media information.

20. A method for deploying a system for managing software on one or more computing devices, comprising:

providing a computer infrastructure being operable to:
retrieve an audio recording;

identify supplemental information associated with the audio recording, wherein the supplemental information includes additional information beyond information in a transcript based at least in part on one or more words in the audio recording and information associated with one or more speakers of the audio recording, wherein identifying supplemental information included at least in part identifying supplemental information on Internet related to topics in the transcript;

convert the audio recording to a transcript of the audio recording; and generate a summary of the transcript of the audio recording including at least in part the identified supplemental information.

* * * * *